US009976859B2

United States Patent
Pfeifle

(10) Patent No.: US 9,976,859 B2
(45) Date of Patent: May 22, 2018

(54) NAVIGATION API BASED ON VIRTUAL TABLES

(71) Applicant: HERE Global B.V., Eindhoven (NL)

(72) Inventor: Martin Pfeifle, Seewald (DE)

(73) Assignee: HERE Global B.V., Eindhoven (NL)

( * ) Notice: Subject to any disclaimer, the term of this patent is extended or adjusted under 35 U.S.C. 154(b) by 34 days.

(21) Appl. No.: 14/835,221

(22) Filed: Aug. 25, 2015

(65) Prior Publication Data

US 2017/0059330 A1    Mar. 2, 2017

(51) Int. Cl.
| | |
|---|---|
| G01C 21/20 | (2006.01) |
| G01C 21/34 | (2006.01) |
| G06F 17/30 | (2006.01) |
| G01C 21/32 | (2006.01) |

(52) U.S. Cl.
CPC .......... *G01C 21/20* (2013.01); *G01C 21/32* (2013.01); *G01C 21/34* (2013.01); *G06F 9/451* (2018.02); *G06F 17/3056* (2013.01); *G06F 17/30241* (2013.01); *G06F 17/30318* (2013.01); *G06F 17/30477* (2013.01)

(58) Field of Classification Search
CPC ........ G06F 17/30241; G06F 17/30318; G06F 17/30477; G06F 9/451; G06F 17/3056; G01C 21/32; G01C 21/20; G01C 21/34; G01S 2205/008; Y10S 707/99931
See application file for complete search history.

(56) References Cited

U.S. PATENT DOCUMENTS

| | | | | |
|---|---|---|---|---|
| 6,199,045 | B1 * | 3/2001 | Giniger | H04L 63/0428 340/990 |
| 6,233,520 | B1 * | 5/2001 | Ito | G01C 21/32 701/431 |
| 6,381,534 | B2 * | 4/2002 | Takayama | G01C 21/3626 348/552 |
| 8,756,261 | B2 * | 6/2014 | Pfeifle | G06F 17/30318 707/825 |

(Continued)

FOREIGN PATENT DOCUMENTS

EP    2354985 A1    8/2011

OTHER PUBLICATIONS

Gennaro Costagliola et al., "GISQL—A Query Language Interpreter for Geographical Information Systems" in "Visual Database Systems 3" pp. 275-286, 1995.

(Continued)

*Primary Examiner* — Jason Holloway
(74) *Attorney, Agent, or Firm* — Alston & Bird LLP

(57) ABSTRACT

Methods, apparatuses, and systems are provided which receive requests for map data, and generate virtual tables for accessing underlying navigational map data. Navigational functionality may be offered through structured query language (SQL) commands for all kinds of navigation data by the use of virtual tables. By offering functionality through SQL commands map developers benefit because there is no difference in accessing low-level data of the navigation database and higher-level functionality such as displaying map components. The commands used to send information to the graphic user interface, the navigation core, as well as the data access layer may all be accessed using virtual tables and SQL commands.

17 Claims, 12 Drawing Sheets

(56) References Cited

U.S. PATENT DOCUMENTS

| | | | | |
|---|---|---|---|---|
| 2008/0177464 | A1* | 7/2008 | Fuchs | G06F 17/30241 701/533 |
| 2009/0030606 | A1* | 1/2009 | Pfeifle | G01C 21/32 701/533 |
| 2009/0063453 | A1* | 3/2009 | Adler | G06F 17/30545 |
| 2011/0196890 | A1* | 8/2011 | Pfeifle | G06F 17/30241 707/769 |
| 2013/0132411 | A1* | 5/2013 | Pfeifle | G06F 17/30321 707/758 |

OTHER PUBLICATIONS

PCT International Search Report and Written Opinion of the International Searching Authority dated Oct. 26, 2016 for corresponding PCT/EP2016/067754.

Intelligent Transport Systems—Navigation Systems—Application Programming Interface (API), Nov. 15, 2009, ISO.

SQLite FTS3 and FTS4 Extensions, accessed Mar. 27, 2015, SQlite.org.

The Virtual Table Mechanism of SQLite, accessed Mar. 27, 2015, SQlite.org.

Dr. Özgür Tasdelen and Jürgen Klasch, "Systematic Parking Space Information (SPSI)", Gründen-Live 2015 Competition, Aug. 4, 2015, 8 pages, https://www.gruenden-live.de/ideenwettbewerb/6/2278, Germany.

APCOA Parking Holdings GmbH, "Search for parking space devours time and money", APCOA Parking Study 2013, Infographics, Aug. 15, 2013, retrieved from <http://www.apcoa.de/fileadmin/apcoa_de/images/News/APCOA-PARKING-Study-EN.pdf> on Feb. 1, 2018, 1 page.

APCOA Parking Holdings GmbH, "APCOA Parking Study: Search for parking space devours time and money", Press Release, Aug. 15, 2013, retrieved from <http://www.apcoa.com/press-news/read-article/apcoa-parking-study-search-for-parking-space-devours-time-and-money.html> on Feb. 1, 2018, 3 pages.

Siemens, "The sensor-controlled parking management system—parking space without searching (optimize usage of parking spaces and reduce traffic)", Feb. 25, 2015, retrieved from <https://www.siemens.com/press/en/presspicture/?press=/en/presspicture/2015/mobility/2015-02-smart-parking/ig2015020006moen.htm> on Feb. 1, 2018, 1 page.

Siemens, "The sensor-controlled parking management system—parking space without searching (saving time and the environment)", Feb. 25, 2015, retrieved from <https://www.siemens.com/press/en/presspicture/?press=/en/presspicture/2015/mobility/2015-02-smart-parking/im2015020482moen.htm> on Feb. 1, 2018, 1 pages.

Siemens, "The sensor-controlled parking management system—parking space without searching (sensor network)", Feb. 25, 2015, retrieved from <https://www.siemens.com/press/en/presspicture/?press=/en/presspicture/2015/mobility/2015-02-smart-parking/im2015020408moen.htm> on Feb. 1, 2018.

Siemens, "The sensor-controlled parking management system—parking space without searching (detects blocking and illegally parked vehicles)", Feb. 25, 2015, retrieved from <https://www.siemens.com/press/en/presspicture/?press=/en/presspicture/2015/mobility/2015-02-smart-parking/ig2015020007moen.htm> on Feb. 1, 2018.

Siemens, "The sensor-controlled parking management system—parking space without searching (smartphone application)", Feb. 25, 2015, retrieved from <https://www.siemens.com/press/en/presspicture/?press=/en/presspicture/2015/mobility/2015-02-smart-parking/ig2015020008moen.htm> on Feb. 1, 2018.

Siemens, "The sensor-controlled parking management system—parking space without searching (overhead sensor systems on streetlights)", Feb. 25, 2015, retrieved from <https://www.siemens.com/press/en/presspicture/?press=/en/presspicture/2015/mobility/2015-02-smart-parking/im2015020410moen.htm> on Feb. 1, 2018.

* cited by examiner

NAVIGATION API BASED ON VIRTUAL TABLES

FIELD

The following disclosure relates to a navigation application programming interface (API) based on virtual tables, or more particularly, systems and algorithms for accessing, updating, and manipulating navigation data using virtual tables.

BACKGROUND

Traditional map navigation applications may require developers to know a variety of different programming languages/interfaces for accessing different layers of the navigation development stack which may include the graphical user interface (GUI), navigation core (such as the map display, vehicle positioning, routing, and destination input layers), and data access layer. Navigation systems may make use of industry standardization so that developers know which commands to use in which language at which layer in the navigation development stack. The upper levels of the navigation development stack, such as the navigation access and navigation core layers, typically use object oriented programming languages, scripting languages, or procedural languages. In order to allow the GUI code to conveniently access the navigation core, a wrapper module is required which maps the language of the GUI to the language of the navigation core. Typically, the navigation core provider provides such a wrapper for each GUI language which might be used. If a GUI is written in Java, a Java wrapper for the navigation core is required. Obviously, this approach may be very resource-intensive, e.g. requiring significant development time and/or cost, as many different suitable GUI languages exist.

SUMMARY

Methods, apparatuses, and systems are provided which receive requests for map data, and generate virtual tables for accessing underlying navigational map data using the same singular non-proprietary interface, such as structured query language (SQL), to access the virtual table and is used to access the underlying navigational map data. Navigational functionality may be offered through SQL commands for various kinds of navigation data by the use of virtual tables. By offering functionality through SQL commands map developers may benefit via normalization of the mechanisms by which low-level data of the navigation database and higher-level functionality such as displaying map components are implemented and/or accessed. The commands used to send information to the graphic user interface, the navigation core, as well as the data access layer may all be accessed using virtual tables and SQL commands.

The following embodiments provide systems and methods for accessing navigational map data. A method, apparatus, and system are provided which receives routing requests and generates virtual tables on receipt for accessing underlying navigational map data. A virtual table may be used to access the navigational map data. The virtual table may be used to access a variety of different underlying map data through the same type of interface. The type of request for map data may determine how the virtual table is constructed. Using the virtual table the appropriate map data may be extracted from the navigational map data and sent to an end user, a server, or some other system.

In one embodiment, a user of a map developer system wishes to manipulate routing data for a map. The map developer may receive a request for routing data. The request may have a type. The routing data may be display data, route data, or name data in a navigational map. The map developer may determine the type of request for routing data. The type of requests determines what routing data is to be accessed. The map developer may generate a virtual table based on the determination and routing data from a routing database. The virtual table includes a subset of routing data from the routing database. The map developer may access the virtual table using the routing request to obtain routing data from the routing database. The map developer may construct a map tile command based on the obtained routing data in the virtual table and the routing request. The map developer may send the map tile command to a navigation application or mobile device.

In another embodiment, an apparatus including at least one processor, and at least one memory including computer program code for one or more programs, the at least one memory and the computer program code configured to, with the at least one processor, cause the apparatus to at least perform, receive a request for map route data, wherein the request has a type, determine the type of request, construct a virtual table based on the type of request and map route data in a routing database, the virtual table including at least a subset of map route data from the routing database, interpret the virtual table using the request for map route data to obtain map route data, and generate a map command based on the obtained map route data in the virtual table.

In another embodiment, a non-transitory computer readable medium is operable to execute instructions for accessing navigational map data. The instructions when executed receive a request for map routing data, wherein the map routing data has a type, determine the type of request, generate a virtual table based on the type of request and map routing data from a routing database, wherein the virtual table includes a subset of map routing data from the routing database, access the virtual table using the type of request to obtain map routing data, construct a map tile command based on the obtained map route data in the virtual table, and send the map tile command to a mobile device.

BRIEF DESCRIPTION OF THE DRAWINGS

Exemplary embodiments are described herein with reference to the following drawings.

DETAILED DESCRIPTION

Modern navigation systems may use multiple different programming languages, e.g. query/command protocol, structure and/or format, to implement software interfaces to and among the components included in the navigation system. Such systems using different components implementing different programming language based interfaces may increase the amount of time and cost associated with developing these navigation systems and navigation access libraries. For example, the underlying navigation map database may be typically stored in a SQL compatible format which allows for standardized access to the navigation map database as well as the other components of the navigation system using standard SQL commands. However, the GUI, and navigation core layers of the navigation system typically are written in object oriented programming languages or procedural languages as opposed to a standardized, e.g. SQL, format, using non-standard software interfaces.

Figure 6:
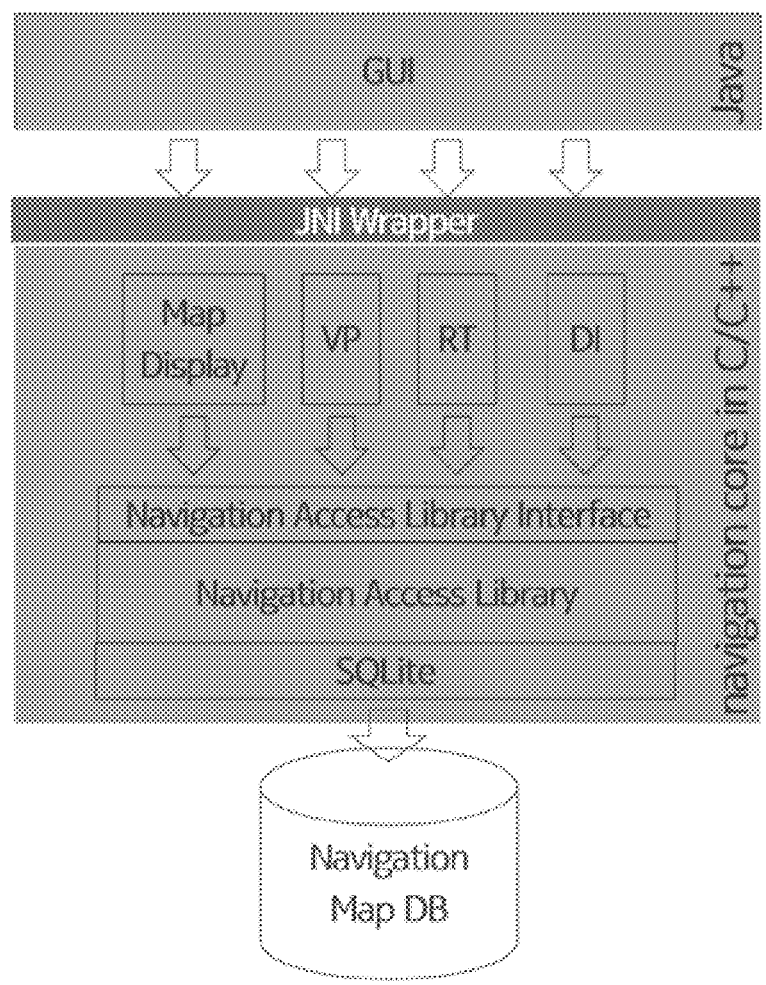
FIG. 6 illustrates an exemplary navigation system implemented using multiple programming languages.

FIG. 6 illustrates an exemplary navigation system 600 of how a navigation system may be organized that uses multiple programming languages to communicate between the different levels of the navigation stack. The system 600 includes a GUI 602, a map display component 604, a vehicle positioning component 606, a routing component 608, a destination input component 610, a navigation access library interface 612, a navigation access library 614, and a navigation map database 616. The GUI 602 may be accessed and manipulated by using the Java programming language, the lower levels use C/C++ for accessing and manipulating the navigation core, while the navigation map database 616 stores data in a format that is compatible with SQL commands.

In contrast to the system shown in FIG. 6, the disclosed embodiments relate to a method for using virtual tables to normalize access to navigation map data using a standard interface protocol/format. Accessing navigation map data historically has been achieved by receiving a query for the data at a high level in the navigation stack in one particular protocol, e.g. programming language, and then converting, translating or otherwise interpreting that programming language into another protocol/programming language for accessing the underlying data. A map developer may obviate the need for using multiple programming languages to access the different components of the navigation system by using a standardized protocol, e.g. a set of standardized query commands, such as SQL commands, and virtual tables to access the navigation system components. A standardized API is proposed which allows for access the various components of the navigation system.

A virtual table may be a database table that is constructed with data derived from another database. A virtual table may be accessed like a table in a database which means that operations that allow for insertion of data into the virtual table, deletion of data in the virtual table, or viewing of data in the virtual table, as well as other operations, are possible. A virtual table may differ from a "view" of a database which queries the actual database but is not part of the physical schema of the database, because a virtual table functions as a copy of a particular set or subset of data from the underlying database rather than merely existing as a stored query which is re-executed, responsive to an access to the view, against the underlying database to generate a result set which acts like a table. Therefore, when a user accesses, or manipulates the virtual table they are accessing or manipulating the virtual table and not the underlying database from which the virtual table was derived. The virtual tables may result in storage savings since the virtual tables may be created on demand.

Figure 1:
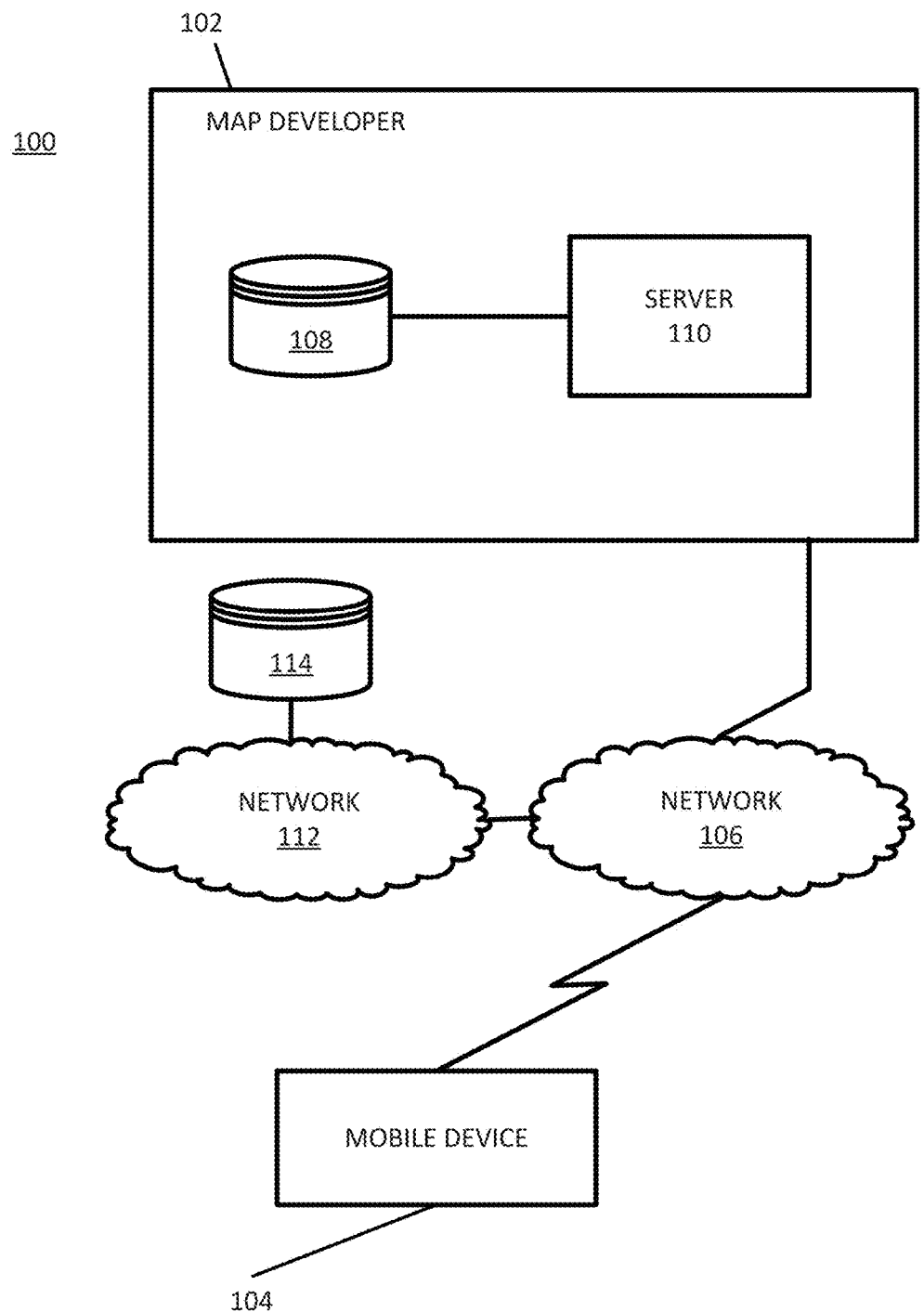
FIG. 1 illustrates an exemplary system for using a navigation API based on virtual tables.

FIG. 1 illustrates an exemplary architecture/system 100 for storing data for using a navigation API based on virtual tables. The system 100 includes a developer system 102, one or more mobile devices 104, hereinafter "mobile device", and a network 106. Additional, different, or fewer components may be provided. For example, many mobile devices 104 connect with the network 106. The developer system 102 includes a server 110 and one or more databases 108. The system 100 may further include an additional database 114 which is coupled to a separate network 112 from the mobile device 104 and map developer 102. In some embodiments the system 100 may use the methods depicted in FIG. 5, 9, or 11, to use the navigation API based on virtual tables.

Databases 108 and 114 may be geographic databases that store navigational map data collected from one or more mobile devices 104, or navigational map data stored in the database 108 as part of the map developer system 102. In some embodiments, the databases 108 and 114 may be coupled with the processor 902 of the mobile device 104, or the processor 1102 of the server 110. The navigational map data may include basic map display data, tile data, route data, road data, link data, name data, or historical traffic data that are stored in a table in the databases 108 and/or 114. Tile data may refer to data collected by a vehicle, or individual, driving routes in the real world. Tile data may also refer to data that when constituted together make up the map data for a region of a map such as a city, state, county, country, or some combination thereof. The tile data stored in the databases 108 and 114 may be data related to one or more vehicles traveling along a route or routes. A user of the mobile device may indicate that they wish to receive routing data from point A to point B. The tile data may indicate whether or not road links between adjacent tiles are compatible with each other, and thus able to form a route when pieced together.

Figure 2:
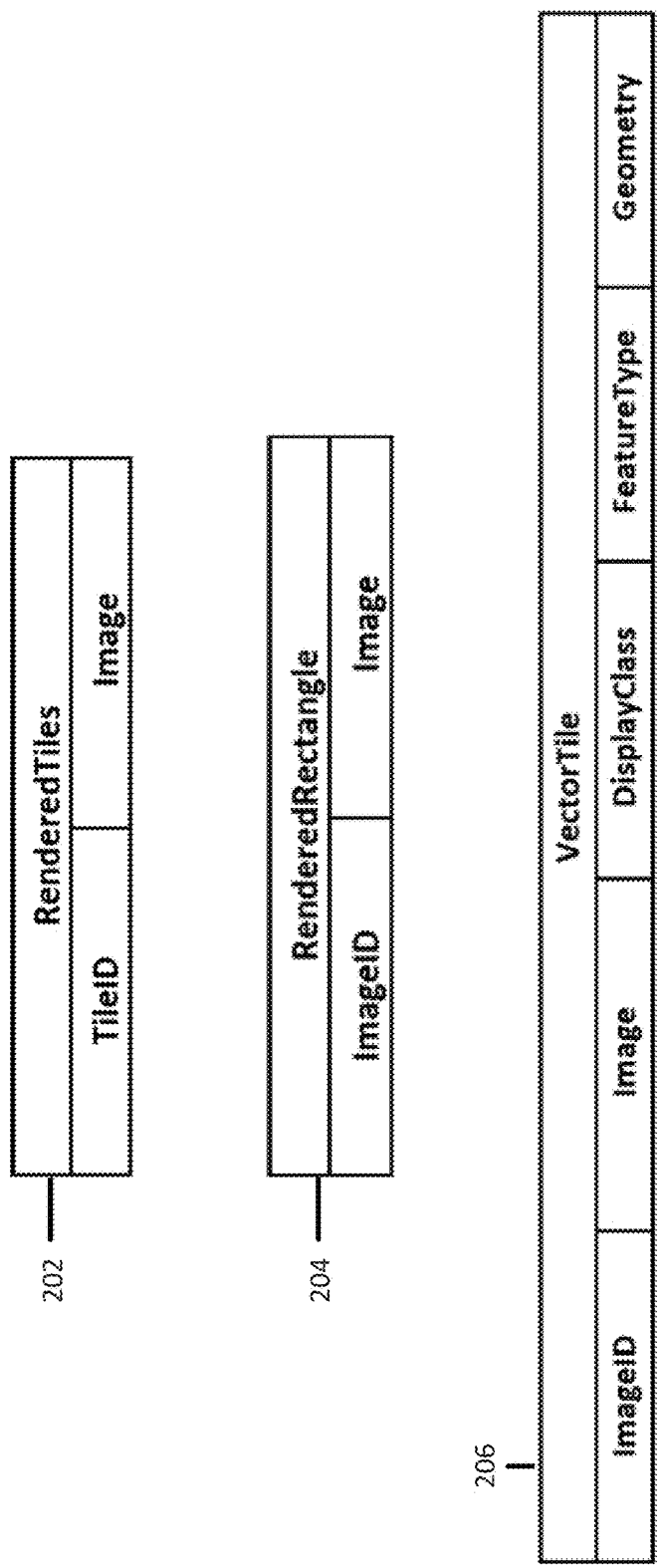
FIG. 2 illustrates exemplary virtual tables for basic map display.
Figure 3:
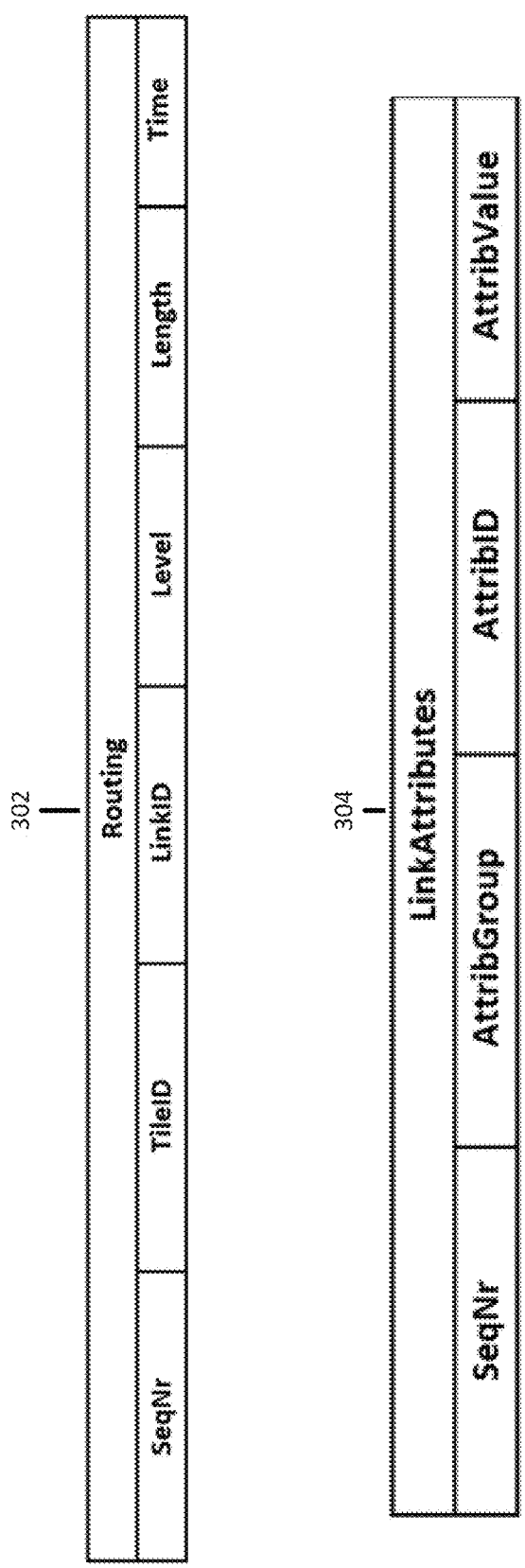
FIG. 3 illustrates exemplary virtual tables for routing.
Figure 4:
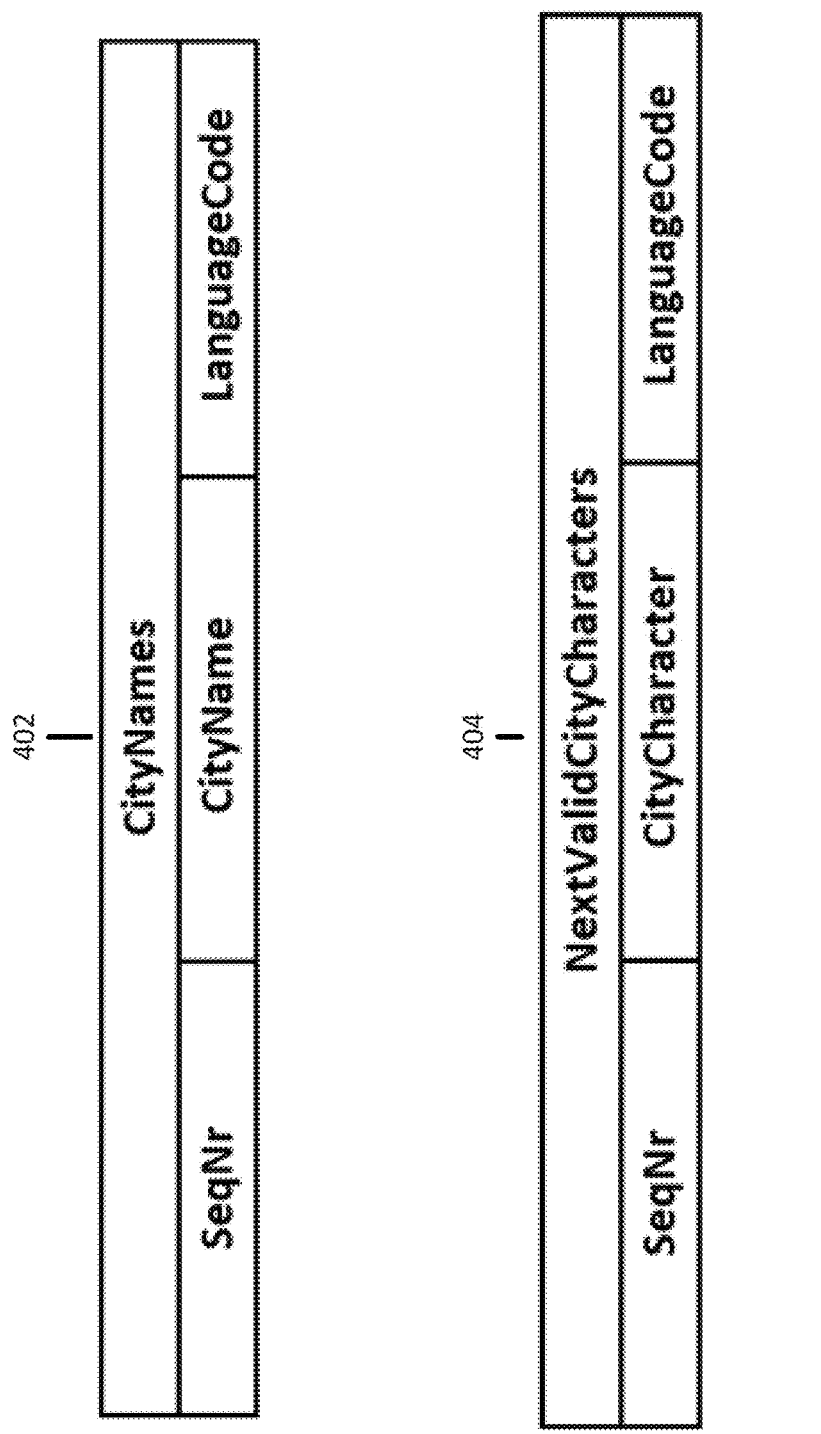
FIG. 4 illustrates exemplary virtual tables for map names.

Virtual tables may be derived at the server 110 or mobile device 104. The virtual tables may be structured to facilitate access to navigation map data. The virtual table allows for a map developer of mobile device to access a variety of different navigation map data. A user creates a virtual table by using a module which reads data from the underlying data (e.g. navigation map data) performs necessary operations (e.g. computations), and provides the results to the user in a virtual table. Exemplary virtual tables are shown in FIGS. 2, 3, and 4.

The system 100 may receive a request for routing data. The request may be received by the communication interface 1106 of the server 110, or the communication interface 908 of the mobile device 104. The request may be for tile data which may be used to build a map for a region of interest, such as a city, county, state, region, country, or some combination thereof. In other embodiments the mobile device 104 receives the request. The request may originate from an end user of the system, such as a driver in a vehicle utilizing a mobile device functioning as a navigation application. Alternatively the request may originate from a server. The routing request may correspond to an address, a building, a landmark, a point of interest, or some other geographic identifier stored in the database 108. The request may be a rendering request to render particular tile data.

The system 100 may perform a determination of the type of request. In other embodiments the mobile device 104 or server 110 performs the determination of the request. The type of request may be a display request, a route request, a name request, or some combination thereof. A display request may be a request for basic map display to a GUI, or to be sent to a mobile device or a server. The basic map display request may be for tile based rendering, region based rendering, or tile based vector data. A route request may be a route computation request, a link attribute request, or some combination thereof. A name request may be a place name request, a next valid character request, or some combination thereof.

The system 100 may generate a virtual table based on the determination and routing data stored in a route database. The virtual table may contain a subset of data that corresponds to the request type for routing data. The functions may be in the form of structured query language functions. For example, the columns and rows of data in the virtual table are accessible by SQL commands, or a query format that is the same as used by the route database, e.g. the route database and the virtual database may be accessed using the same query format, such as SQL. The virtual table may be generated with data from local databases 108, e.g. databases accessible only to the system 100, data from databases 114 stored on a separate network 112, e.g. accessible to a plurality of systems, or some combination thereof. Databases 114 stored on the separate network 112 may be stored as part of a distributed "cloud storage" network where the physical storage of data may be implemented across one or multiple servers in the same or different geographic locations. A database 108 and/or 114 may be coupled with the system 100, and only accessible by the map developer 102, or the mobile device 104. Conversely, the system may connect to another database 114 which is accessible by a plurality of devices different from the map developer 102 and mobile device 104. The databases 108 and/or 114 may be coupled with the processor 902 of the mobile device 104, or the processor 1102 of the server 110.

The tiles in a tile based rendering request may be rendered in .JPG, .BMP, .PNG, or any other image format now known or later developed. Similarly, region based rendering may be rendered in .JPG, .BMP, .PNG, or any other image format now known or later developed. In some embodiments, region based rendering may be based on a request that indicates x and y coordinates for the rendering request. For example, the parameters for the region based rendering request may indicate an x minimum, x maximum, y minimum, and y x maximum. The corresponding region would be rendered according to the rectangle formed by the x and y coordinates. Other geometric shapes may be rendered depending on the x and y coordinates. For vector based data, requests for the geometry of an area, line, or point by generating a second virtual table in relation to the first virtual table.

The route data received in response to a route computation request may include the results of calculating the distance, time, or some combination, from one point of interest to another point of interest. For example, the request may indicate the starting link id number and the ending link id number for the request. Additionally, links at different levels in the navigation map data may be selected according to the request. In other embodiments, the routing request may be a link attribute request. The link attributes may be the number of lanes on a road, the speed limit on a road, and any time constraints on the road, any geometry values associated with a link, any vehicle constraints, any geometry curvature or slope values, or some combination thereof.

The name data returned in response to a name request may be a list of countries, cities, or streets, as well as a next valid character request for countries, cities, or streets. The request for the name of countries, cities, or streets may be based on what a user of the system has already entered. For example, if a user enters the letter "C," the request may provide from the data stored in the virtual table "Chicago," "Chaska," or "Cadillac." Similarly, the system may provide the city name and state name, as well as the country name for the request. In some embodiments, the system 100, mobile device 104, or server 110, indicates the country id for the location of where the user is presently located when entering the request to narrow the search to cities located in that country. Similarly, if the system language for the GUI is set to German then only German cities may be listed. IN some embodiments if a next valid character request is being processed by the system 100 additional virtual tables may be generated to determine the relationship between virtual tables and the virtual tables' relation to the request for routing data.

The system 100 may access the virtual table based on the request for routing data to obtain route data. The request for routing data may be in the format of parameters supplied to SQL functions for accessing the virtual tables. The system may access the virtual table according to certain parameters dependent on the type of request for routing data.

The system 100 may construct a map tile command based on routing data in the virtual table. The routing data may be data from local databases 108, data from databases 114 stored on a separate network 112, or some combination thereof. The routing data may be stored in a navigation database standard database, a proprietary database, or some combination there. The routing data may be text, image files, or binary large objects, or some combination thereof. In some embodiments, the map tile command is constructed by using data stored on a server on a network separate from the processor and communication device used by the method.

In some embodiments the system 100 may send the map tile command to a mobile device 104. In other embodiments the system 100 may send the map tile command to a server 110, a group of servers, or other mobile devices on the network 106 and/or the network 112.

FIG. 2 illustrates exemplary virtual tables which may be used for basic map display in accordance with the disclosed embodiments. A basic map display virtual table may include tile based rendering, region based rendering, and tile based vector data. FIG. 2 includes an example tile rendering virtual table "RenderedTiles" 202, region based rendering virtual table "RenderedRectangle" 204, and tile based vector data "VectorTile" 206. The RenderedTiles table includes a TileID column, which corresponds to a map tile id number, and an Image column, which corresponds to the image data for the tile id number. The RenderedRectangle table includes an ImageID column, which indicates the id number for image data, and an Image column, which corresponds to image data.

The following SQL commands may be used for rendering and manipulating the tables in FIG. 2. For example, the following SQL commands may be used to create the RenderedTiles table: CREATE VIRTUAL TABLE RenderedTiles USING vtm_ndsBMD(TileID, Image, params=TileRendering). To access the virtual table the following commands may be used: SELECT*FROM RenderedTiles WHERE RenderedTiles PARAMS (TileID: 123-

23432, RenderTyp: BMP). Here the tiles with id numbers from 123-23432 would be retrieved from the navigation map data and produced in .BMP format.

Similarly, the following SQL commands may be used to create the RenderedRectangle table: CREATE VIRTUAL TABLE RenderedRectangle USING vtm_ndsBMD(ImageID, Image, params=RectangleRendering. To access the virtual table the following commands may be used: SELECT*FROM RenderedRectangle WHERE RenderedRectangle PARAMS (Rectangle:(xmin, xmax, ymin, ymax), RenderTyp: BMP). Here the region returned would correspond to a rectangle within the bounds of the x and y coordinates in a .BMP format.

Lastly, the following SQL commands may be used to create the VectorTile table: CREATE VIRTUAL TABLE VectorTile USING vtm_ndsBMD(TileID, FeatureID, BMDTyp, DisplayClass, FeatureTyp, Geometry, params=VectorData). Here FeatureID indicates a unique ID of the basic map display feature inside the tile. BMDTyp indicates whether the basic map display feature is an 'Area', 'Line' or 'Point'. DisplayClass is a numeric value indicating which feature should be drawn first. FeatureTyp is a numeric value telling indicating whether the basic map display is a lake, woodland, built-up, river, etc. Geometry contains the geometry in a binary large object (BLOB). The encoding of the BLOB can be in JavaScript Object Notation (JSON), datascript encoded, or Well-known text (WKT). To access the virtual table the following commands may be used: SELECT*FROM VectorTile WHERE VectorTile PARAMS (TileID: 123-23432) and BMDTyp='Area' order by DisplayClass. Here the SQL-engine filters the result set provided by the virtual table module based on the feature type and sorts the results so that they can be used directly for drawing.

FIG. 3 illustrates exemplary virtual tables which may be used for routing in accordance with the disclosed embodiments. A routing virtual table may include route computation request or link attributes request. FIG. 3 includes an example routing virtual table "Routing" 302, and link attributes table "LinkAttributes" 304. The Routing table 302 includes a SeqNr column, TileID column, LinkID column, Level column, Length column, and Time column. Here SeqNr indicates a unique ID describing the sequence of the links in the computed route path, TileID and LinkID describe the link inside the database, Level indicates on which level of the routing DB the link is contained (it can also be derived from the TileID), Length describes the length of the link, and Time describes the time required for travelling along the link. The LinkAttributes table 304 includes a SeqNr column, an AttribGroup column, an AttribID column, and an AttribValue column. Here SeqNr indicates a unique number, AttributeGroup is a value which can be used to represent the grouping of attributes, AttributeID indicates the attribute ID, e.g. SpeedLimit, NumberOfLanes, and AttributeValue describes the value of the attribute in a binary format, e.g. as described by datascript in NDS.

The following SQL commands may be used to create the Routing table 302: CREATE VIRTUAL TABLE Routing USING vtm_ndsRouting(SeqNr, TileID, LinkID, Level, Length,Time, params=Routing). To access the virtual table the following commands may be used: SELECT*FROM Routing WHERE Routing PARAMS (StartTile: 1234, StartLink: 17, EndTile: 4566, EndLink 47). This command would compute the route from link 17 in tile 1234 to link 47 in tile 4566. If the application wants to get the length of the route path and the time, the system may use the following SQL-command: SELECT sum(Length), sum(Time) FROM Routing WHERE Routing PARAMS (StartTile: 1234, StartLink: 17, EndTile: 4566, EndLink 47). To access lower level links the following SQL command may be used to create the necessary virtual table: CREATE VIRTUAL TABLE LowerLevelLinks USING vtm_ndsRouting(SeqNr, TileID, LinkID, Level, params=LowerLevelLinks). To access the virtual table the following SQL command may be used: SELECT*FROM LowerLevelLinks WHERE LowerLevelLinks PARAMS (Tile: 124564, Link: 154) and Level=13 order by SeqNr. This command would compute the sequence of links on level 13 ordered in the correct way. Additional tables may be constructed for other routing needs of a user.

The following SQL commands may be used to create the LinkAttributes table 304: CREATE VIRTUAL TABLE LinkAttributes USING vtm_ndsLinkAttributes(SeqNr, AttributeGroup, AttributeID, AttributeValue, params=LinkAttributes). To access the table the following SQL command may be used: SELECT*FROM LinkAttributes WHERE LinkAttributes PARAMS (TileID: 1234, LinkID: 1). Additional tables may be constructed for other link attributes.

FIG. 4 illustrates exemplary virtual tables which may be used for map names in accordance with the disclosed embodiments. A name virtual table may include a list of countries, cities, streets, or a next valid character list for countries, cities, and streets. FIG. 4 includes an example name virtual table "CityNames" 402, and next valid characters table "NextValidCityCharacters" 404. The CityNames table 402 includes a SeqNr column, CityName column, and LanguageCode column. Here SeqNr indicates a unique ID, CityName indicates the names such as 'Magdeburg', 'Mainz', etc., and LanguageCode indicates the language of the CityName string, e.g. DEU for München, ENG for Munich or ITA for Monaco. The NextValidCityCharacters table 404 includes a SeqNr column, a CityCharacter column, and a LanguageCode column. Here SeqNr indicates a unique number, CityCharacter indicates the next valid characters like 'A', 'O', 'U', 'Ü', and LanguageCode indicates the language of the CityCharacters, e.g. DEU for 'Ü', ENG for 'U' or ITA for 'O'.

The following SQL commands may be used to create the CityNames table 402: CREATE VIRTUAL TABLE vt_CityNames USING vtm_Names (SeqNr, CityName, LanguageCode, NamedObjectID params=CityNames). To access the virtual table the following commands may be used: SELECT*FROM vt_CityNames WHERE vt_CityNames PARAMS (CountryID:142, CityStringPrefix:'M'). This command would select all the cities with starting with the letter "M" in the country that corresponds to country id 142. Additional filtering may be performed with more SQL commands.

The following SQL commands may be used to create the NextValidCityCharacters table 404: CREATE VIRTUAL TABLE vt_NextValidCityCharacters USING vtm_Names (SeqNr, CityCharacter, LanguageCode, params=NextValidCityCharacters). To access the table the following SQL command may be used: SELECT*FROM vt_NextValidCityCharacters WHERE vt_NextValidCityCharacters PARAMS (CountryID:142, CityStringPrefix: 'M'). This command would access all the cities starting with an "M" in country id 142 and display the next possible character that actually forms a city name. Additional tables may be constructed for filtering of next valid character tables.

Figure 5:
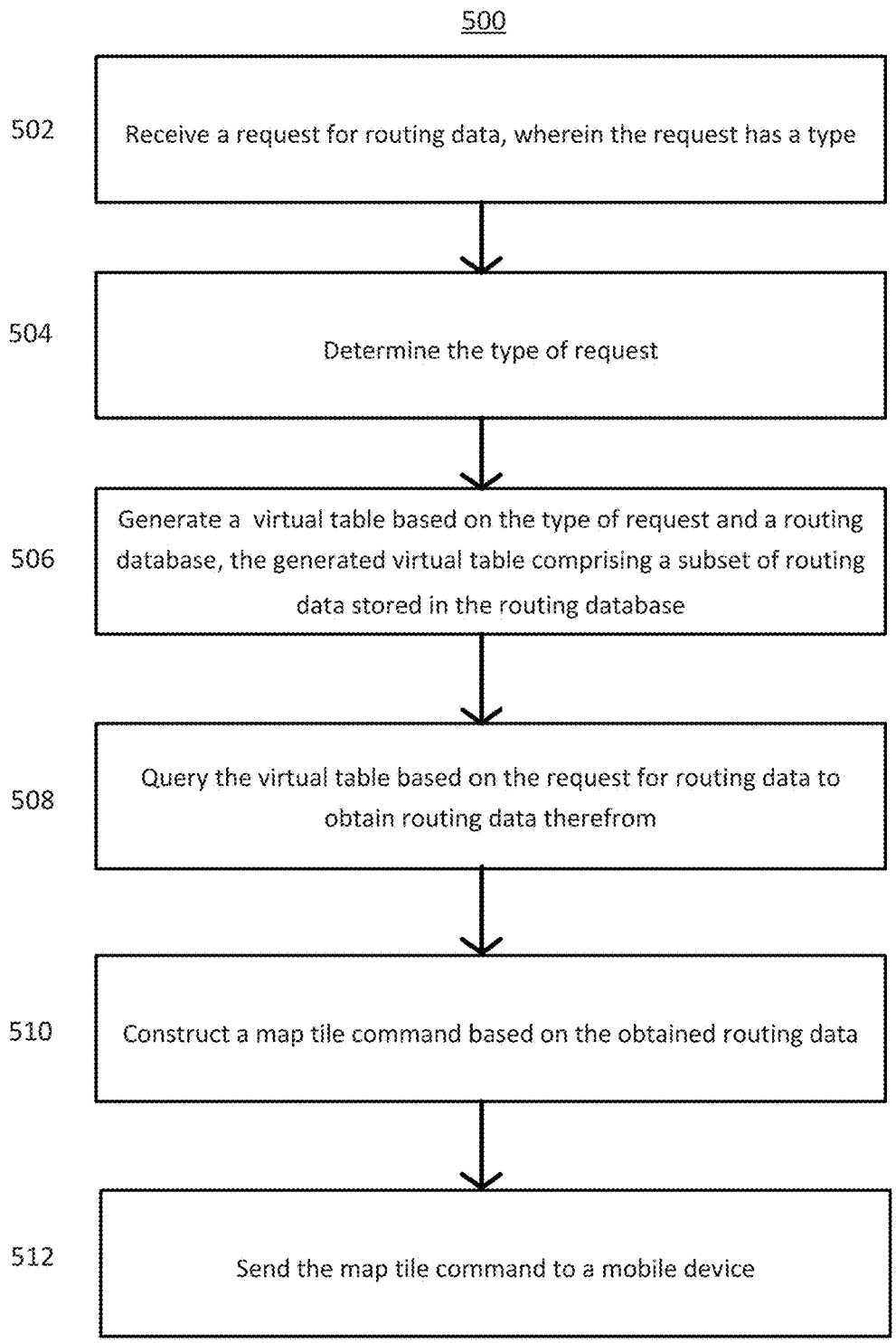
FIG. 5 illustrates an exemplary method for using virtual tables to access navigation map data.

FIG. 5 illustrates an exemplary method for using virtual tables to access navigation map data which may be used, for example, with the system 100 described above. The exemplary method may be performed by the system 100, the mobile device 104, the server 110, or by a combination of all three. At act 502, a request for routing data is received. The request may be received by a communication device, such as the communication interface 908 or communication interface 1106, coupled to a processor, such as the processor 902 or processor 1102. The request may have a type. At act 504 a processor may determine the type of request for routing data. In act 506, the processor may generate a virtual table. The virtual table may be any of the examples shown in FIGS. 2, 3, and 4, or some other virtual table. At act 508, the processor may query the virtual table using the request for routing data. How the table is queried is dependent on the type of request received. At act 510, a processor may construct a map tile command based on the obtained data in the virtual table. The map tile command may correspond to the type of routing request. In act 512, the communication device may send the map tile command to a mobile device, such as a navigation device, navigation application, map developer, or other mapping device. In some embodiments the map tile command may be sent to a testing environment for use in validating the navigation map data.

Figure 7:
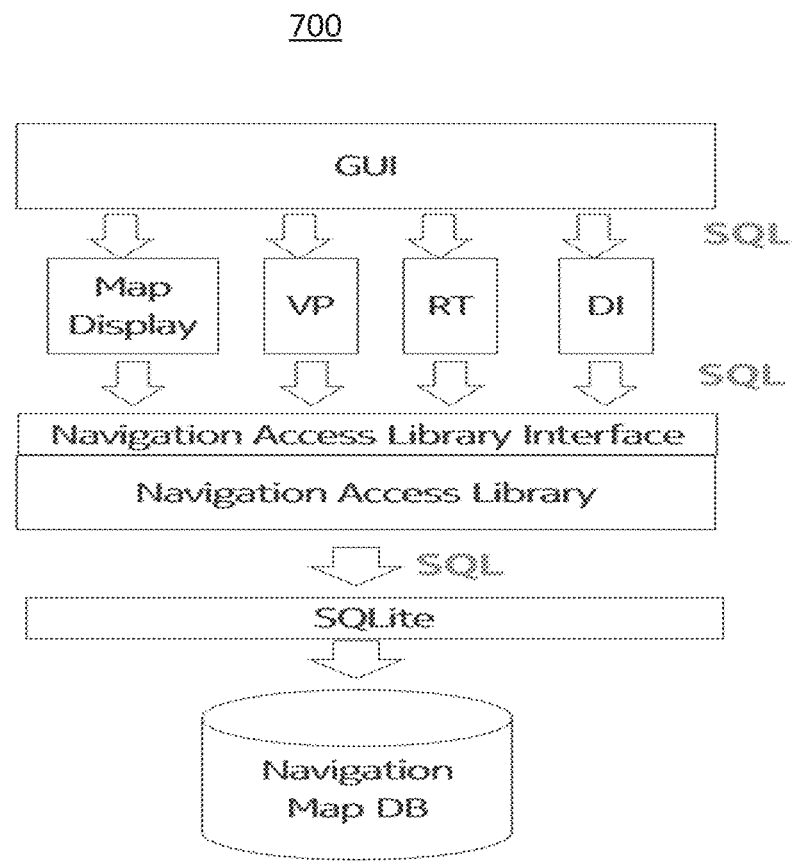
FIG. 7 illustrates an exemplary navigation system that makes use of the navigation API based on virtual tables according to one embodiment.

FIG. 7 illustrates an exemplary navigation system 700 that makes use of the navigation API based on virtual tables described above. The system 700 includes a GUI 702, a map display component 704, a vehicle positioning component 706, a routing component 708, a destination input component 710, a navigation access library interface 712, a navigation access library 714, and a navigation map database 716. In this embodiment SQL may be used by a map developer 102, an end user, or a mobile device 104 to access all of the components in the navigation system 700 as well as the data stored in the navigation map database.

Figure 8:
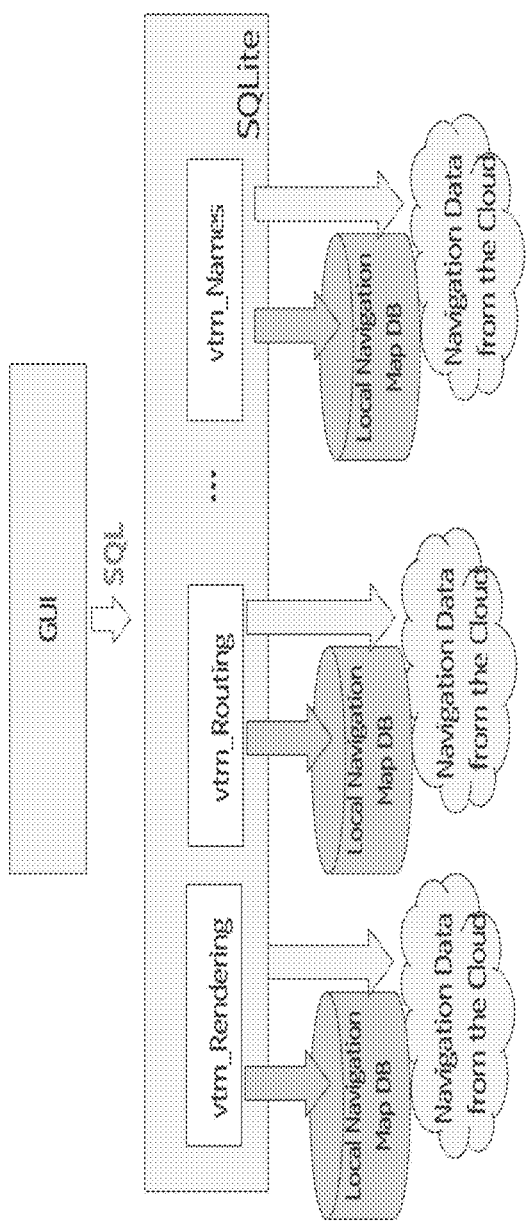
FIG. 8 illustrates an exemplary online integration system for using virtual tables to access navigation map data.

FIG. 8 illustrates an exemplary online integration system 800 for using virtual tables to access navigation map data as described above. All of the virtual table examples listed above are capable of online integration via the system 800. For example, online integration may mean that the navigation system 800 may access navigation map data that is stored on an apparatus, and the navigation system 800 may also access navigation map data that is stored on another device that is connected to the navigation system 800 via a network such as the network 106 or the network 112 of FIG. 1. The system 800 may include a GUI 802, a variety of navigation core components such as rendering 804, routing 806, and names 808, and connections to both a local database 810 and navigation data 812 in the cloud. For example, a virtual table is built for a routing request. The system 800 checks locally for the navigation map data corresponding to the routing request. If the navigation map data is not stored locally the system 800 may obtain the navigation map data from the cloud via HTTP-Rest commands, such as GET, PUT, POST, and DELETE. Whether the data is obtained from the local navigation map database or from navigation data stored in the cloud, a remote database, a multiple device accessible database, or some combination thereof, the data may be communicated to a user of the system 800. Regardless, if the data is obtained from the local database 810, or from the cloud 812, the navigation map data would still be displayed to the GUI 802 of system 800.

Figure 9:
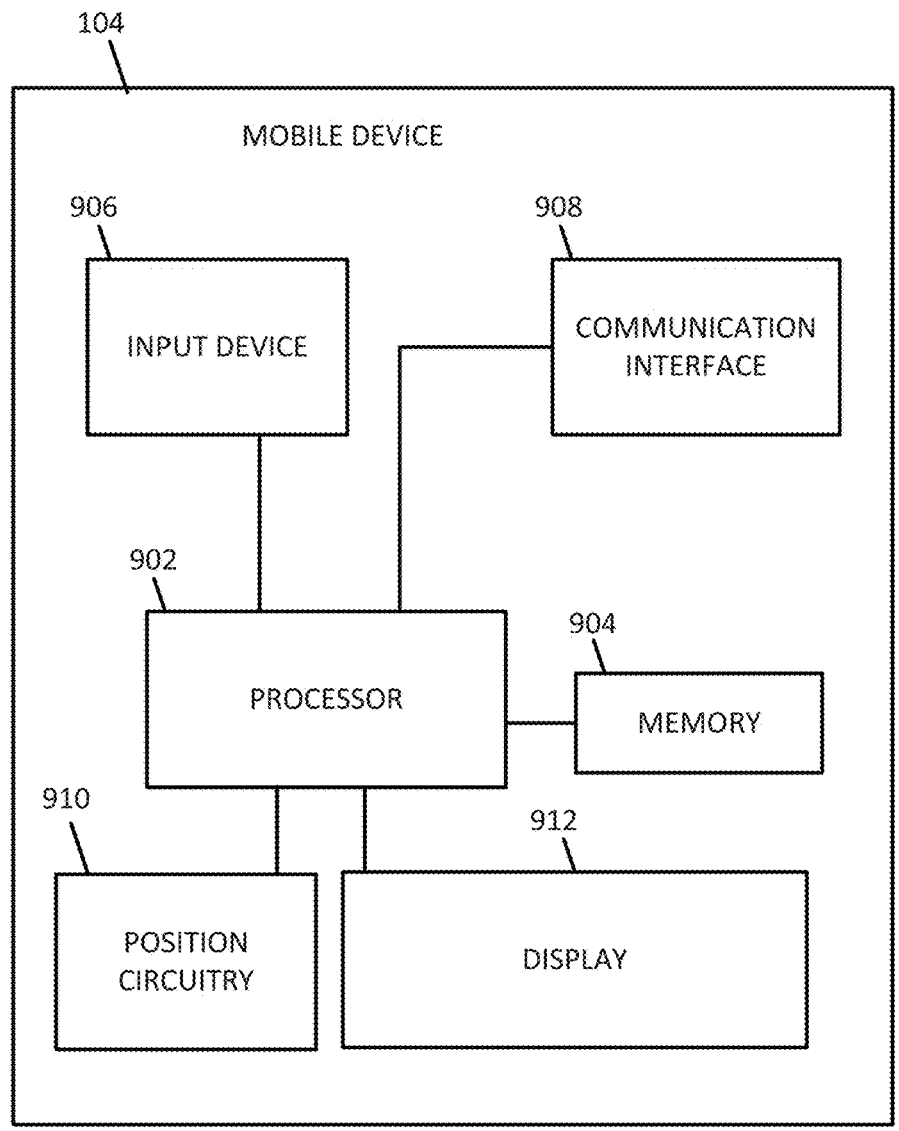
FIG. 9 illustrates an exemplary mobile device for using virtual tables to access navigation map data.

FIG. 9 illustrates an exemplary mobile device 104 for using virtual tables to access navigation map data as described above. FIG. 9 includes a processor 902, a memory 904, an input device 906, a communication interface 908, a position circuitry 910, and a display 912. The processor 902 may be coupled to the communication interface 908. Similarly, the Additional, different, or fewer components are possible for the mobile device 104. The mobile device 104 may be a personal device such as a mobile phone equipped with position circuitry (e.g., global positioning system (GPS)) and an inertial measurement unit (IMU). The position circuitry 910 generates data indicative of the location of the mobile device 104 ("position data"). In addition or in the alternative to GPS, the position circuitry may include a dead reckoning-type system, cellular location, or combinations of these or other systems. The positioning circuitry may include suitable sensing devices that measure the traveling distance, speed, direction, and so on, of the mobile device 104. The positioning system may also include a receiver and correlation chip to obtain a GPS signal.

Figure 10:
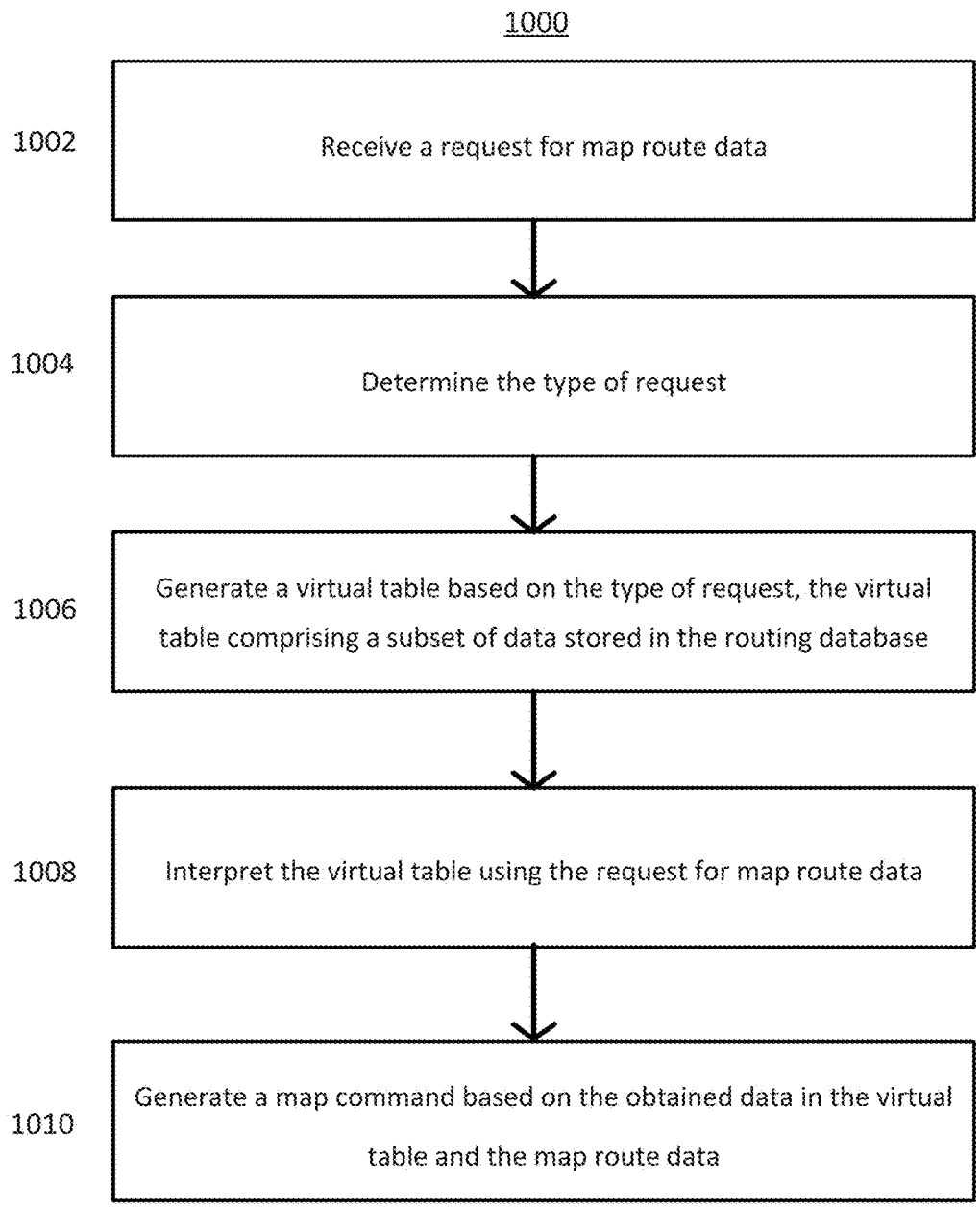
FIG. 10 illustrates an exemplary flowchart for using virtual tables to access navigation map data using the mobile device of FIG. 9.

FIG. 10 illustrates an exemplary flowchart 1000 depicting an exemplary process for using virtual tables to access navigation map data as described above. The acts may be applied in a different order. Acts may be omitted or repeated. Additional acts may be added. At act 1002, the processor 902 or the communication interface 908 may be configured to receive a request for map route data. The route request may be input by the position circuitry 910, the input device 906, a GPS, or other input device integrated with the mobile device 104. At act 1004, the processor 902 may determine the type of route request. The route request may relate to basic display functions, routing functions, and name functions. Other types of requests related to navigation map data may be requested.

At act 1006, the processor 902 constructs a virtual table based on the type of request. The processor may perform this step in conjunction with the memory 904. In some embodiments the processor may construct the virtual table and then send the virtual table to a server or mobile device via the communication interface 910. At act 1008, the processor 902 interprets the virtual table using the map route data. The processor may select from the virtual table the type of data that corresponds to the map request type.

At act 1010, the processor 902 may generate a map command based on the data in the virtual table and the map route data. The processor may generate the map command with the virtual table data, alone, or in combination with other databases.

Figure 11:
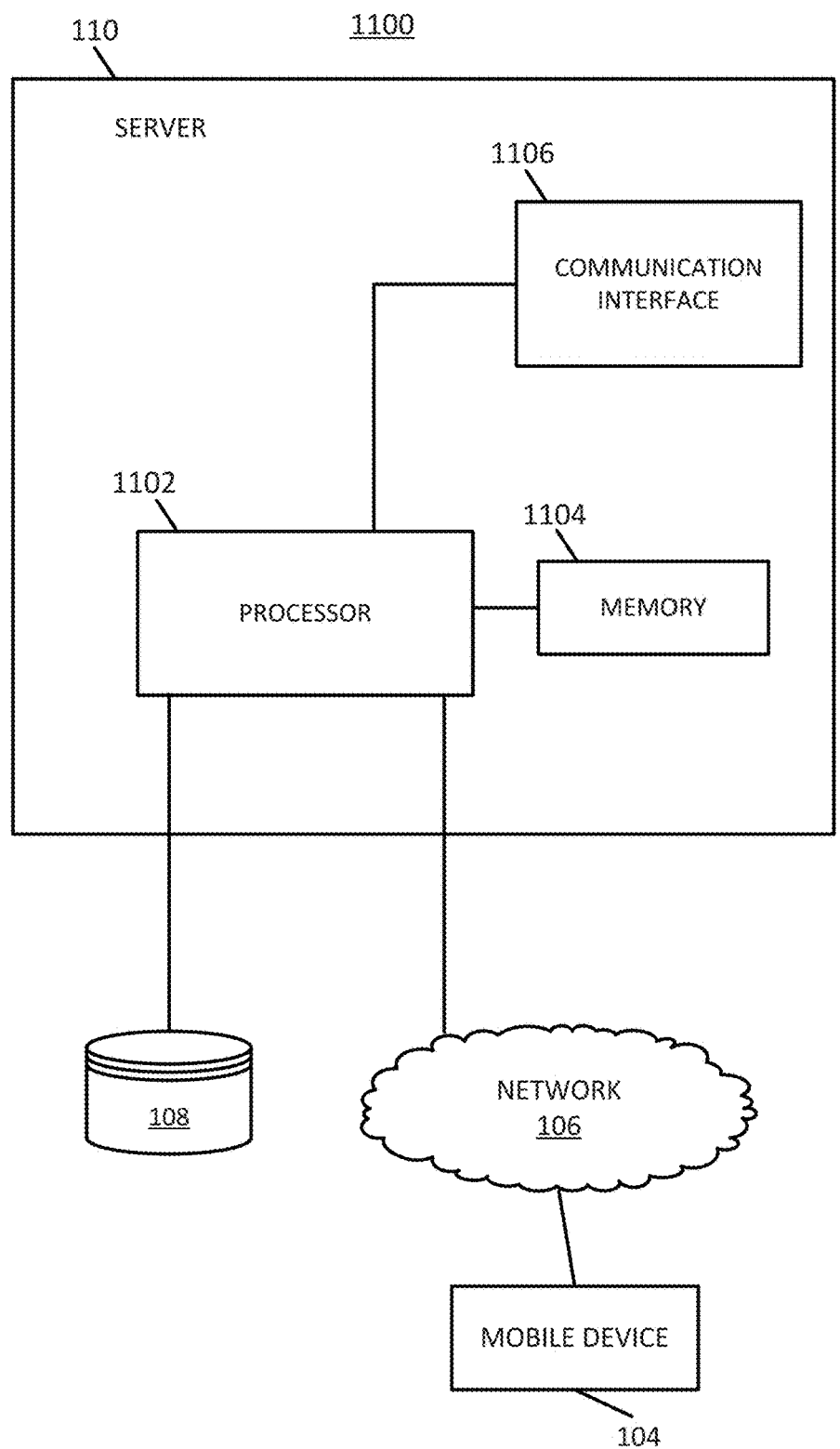
FIG. 11 illustrates an exemplary system for using virtual tables to access navigation map data.

FIG. 11 illustrates an exemplary system 1100 for using virtual tables to access navigation map data. The exemplary server 110 in FIG. 11 includes a processor 1102, a memory 1104, and a communication interface 1106. virtual tables may be sent from the server 110 to the mobile device 104 upon request, in response to a request for routing data, periodically according to a time schedule, or when the navigation application is initiated (e.g., the map developer edits navigation data functionality on the navigation stack that affects how a deployed mobile device access navigation map data).

Figure 12:
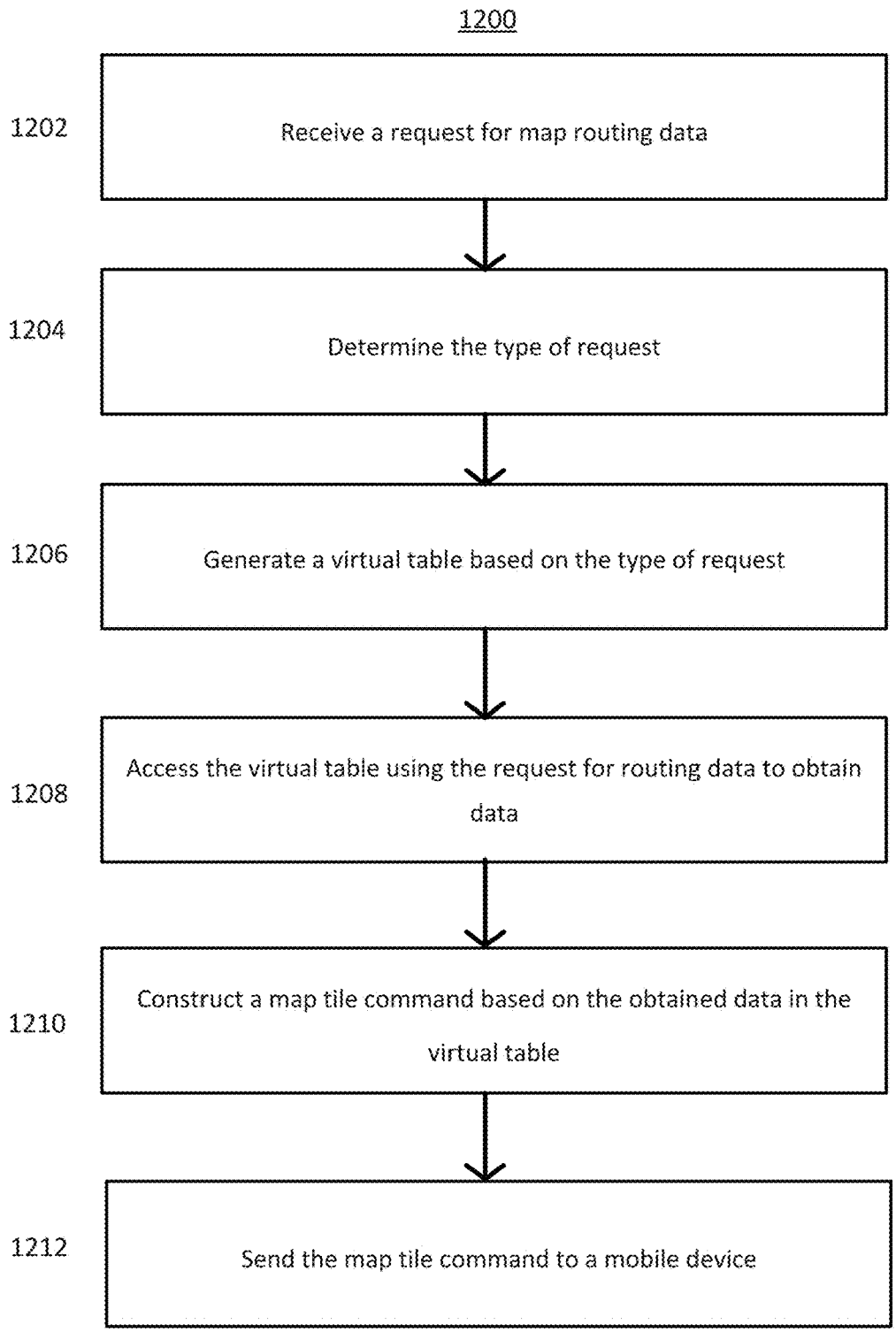
FIG. 12 illustrates an exemplary flowchart for using virtual tables to access navigation map data using the system of FIG. 11.

FIG. 12 illustrates an exemplary flowchart 1200 depicting an exemplary process for using virtual tables to access navigation map data using the system of FIG. 11. The acts of the flowchart 1200 of FIG. 12 may alternatively be performed by the server 110, or a group of servers. Different, fewer, or additional acts may be included.

At act 1202, the processor 1102 or communication interface 1106 receives a request for map routing data through a network 106. At act 1204, the processor 1102 determines the type of request. The type of request may be related to display, routing, or name data for the navigation map data.

At act 1206, the processor 1102 may generate a virtual table based on the type of request. At act 1208, the processor 1102 accesses the virtual table using the routing data and the type of request. In act 1210, processor 1102 constructs a map tile command based on data in the virtual table and the map routing data. At act 1212, the processor 1102 in conjunction with the communication interface 1106, sends the map tile command to a mobile device. In other embodiments the map tile command may be sent to another server, or group of servers.

In addition to the data describe above, the database 108 and/or the database 114 may include node data records, road segment or link data records, POI data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques).

The road segment data records are links or segments representing roads, streets, or paths, as can be used in the calculated route or recorded route information for determination of one or more personalized routes, according to exemplary embodiments. The node data records are end points corresponding to the respective links or segments of the road segment data records. The road link data records and the node data records represent a road network, such as used by vehicles, cars, and/or other entities. Alternatively, for example, the database 108 and/or database 114 may contain path segment and node data records or other data that represent pedestrian paths or areas in addition to or instead of the vehicle road record data.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The databases 108 and 114 may include data about the POIs and their respective locations in the POI data records. The databases 108 and 114 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the databases 108 and 114 can include event data (e.g., traffic incidents, constructions, scheduled events, unscheduled events, etc.) associated with the POI data records or other records of the databases 108 and 114.

Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may also include data that indicate a classification, such as a rank of a road segment that may correspond to its functional class. Example functional classes include arterial roads, collector roads, and local roads. The prerecorded path may include roads outside of the functional classification system. Alternatively, an additional functional classification (e.g., private roads, temporary roads, or personalized roads) may be added to the geographic database to distinguish the prerecorded paths from other segments. Incident rates may be assigned to road segments based on functional classification.

The databases 108 and 114 may be maintained by a content provider (e.g., a map developer). By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The computing device processor 902 and/or the server processor 1102 may perform any of the calculations described herein. The computing device processor 902 and/or the server processor 1102 may include a general processor, digital signal processor, an application specific integrated circuit (ASIC), field programmable gate array (FPGA), analog circuit, digital circuit, combinations thereof, or other now known or later developed processor. The mobile device processor 902 and/or the server processor 1102 may be a single device or combinations of devices, such as associated with a network, distributed processing, or cloud computing. The computing device processor 902 and/or the server processor 1102 may also be configured to cause an apparatus to at least perform at least one of methods described above.

The memory 904 and/or memory 1104 may be a volatile memory or a non-volatile memory. The memory 904 and/or memory 1104 may include one or more of a read only memory (ROM), random access memory (RAM), a flash memory, an electronic erasable program read only memory (EEPROM), or other type of memory. The memory 904 and/or memory 1104 may be removable from the mobile device 104, such as a secure digital (SD) memory card.

The communication interface 908 and/or communication interface 1106 may include any operable connection. An operable connection may be one in which signals, physical communications, and/or logical communications may be sent and/or received. An operable connection may include a physical interface, an electrical interface, and/or a data interface. The communication interface 908 and/or communication interface 1106 provides for wireless and/or wired communications in any now known or later developed format.

In the above described embodiments, the networks 106 and 112 may include wired networks, wireless networks, or combinations thereof. The wireless network may be a cellular telephone network, an 802.11, 802.16, 802.20, or WiMax network. Further, the network 106 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, and HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
receiving, by use of a communication device, a request for navigation data from a mobile device, the request having a type;
determining, by a processor coupled with the communication device, the type of the request, wherein the type of request is (a) a display request, (b) a route request, (c) a name request, or (d) some combination thereof;
generating, by the processor responsive to receipt of the request, a query;
generating, by the processor responsive to receipt of the query, a virtual table, the virtual table generated based on (a) one or more parameters determined based on the determined type of the request from the mobile device and (b) a navigation database, coupled with the processor, in which a set of navigation data is stored, the generated virtual table comprising at least a subset of the set of navigation data stored in the navigation database and independent from schema of the navigation database, the subset being determined by the determined type of the request, the generated virtual table and the navigation database being accessible via a same query format;
querying, by the processor using the query format, the virtual table based on the request for navigation data to obtain the requested navigation data therefrom;
constructing, by the processor, a map tile command based on the obtained navigation data; and
sending, by the communication device, the map tile command to the mobile device.

2. The method of claim 1, wherein the display request further includes a tile render request, a region render request, a tile vector request, or some combination thereof.

3. The method of claim 1, wherein the route request further includes a route computation request, a link attribute request, or some combination thereof.

4. The method of claim 1, where the name request further includes a place name request, a next valid character request, or some combination thereof.

5. The method of claim 1, wherein the query format comprises a format compatible with structured query language (SQL).

6. The method of claim 1, wherein the navigation database may be a database only accessible by a single navigation system, a database accessible by a plurality of navigation systems, or a combination thereof.

7. The method of claim 1, wherein the navigation data may be text, image files, or binary large objects.

8. The method of claim 1, wherein the virtual table is destroyed after the map tile command is sent to the mobile device.

9. The method of claim 1, wherein the navigation data is stored in a navigation database standard (NDS) database, a proprietary database, or some combination thereof.

10. An apparatus comprising:
at least one processor; and
at least one memory including computer program code for one or more programs; the at least one memory and the computer program code configured to, with the at least one processor, cause the apparatus to at least perform:
receive a request for map route data, the request having a type;
determine the type of the request, wherein the type of request is (a) a display request, (b) a route request, (c) a name request, or (d) some combination thereof;
generate a structured query based on the request;
generate a virtual table in response to the structured query, the virtual table generated based on (a) one or more parameters determined based on the type of the request and (b) map route data stored in a navigation database coupled with the processor, the generated virtual table comprises at least a subset of map route data stored in the navigation database but is not part of the schema of the navigation database, the constructed virtual table and the navigation database being accessible via a same query format;
query the virtual table using the request for map route data in the query format to obtain the requested map route data therefrom; and
generate a map command based on the obtained map route data in the virtual table corresponding to the request for map route data.

11. The apparatus of claim 10, wherein the display request further includes a tile render request, a region render request, a tile vector request, or some combination thereof.

12. The apparatus of claim 10, wherein the route request further includes a route computation request, a link attribute request, or some combination thereof.

13. The apparatus of claim 10, where the name request further includes a place name request, a next valid character request, or some combination thereof.

14. The apparatus of claim 10, wherein the navigation database may be a database only accessible by the apparatus, a database accessible by a plurality of apparatuses, or a combination thereof.

15. The apparatus of claim 10, wherein the data is stored in a navigation database standard (NDS) database, a proprietary database, or some combination thereof.

16. A non-transitory computer readable medium comprising instructions that when executed are operable to:
receive a request for map navigation data from a mobile device, the request having a type;
determine the type of the request, wherein the type of request is (a) a display request, (b) a route request, (c) a name request, or (d) some combination thereof;
generate a structured query based on the request;
generate a virtual table in response to the structured query, the virtual table generated based on (a) one or more parameters determined based on the type of the request and map navigation data stored in a navigation database, wherein the generated virtual table comprises at least a subset of map navigation data from the navigation database, the generated virtual table and the route database being accessible via a same query format;
access the virtual table using the request for navigation data to obtain the requested map navigation data;
construct a map tile command based on the obtained map navigation data in the virtual table corresponding to the request for map navigation data; and
send the map tile command to the mobile device.

17. The non-transitory computer readable medium of claim 16, wherein the virtual table is generated with data from databases stored on a network connected to the non-transitory computer readable medium, data from databases stored on a separate network, or some combination thereof.

* * * * *